(No Model.)
A. OAKES.
SAW.
No. 398,792. Patented Feb. 26, 1889.
Fig. 1.
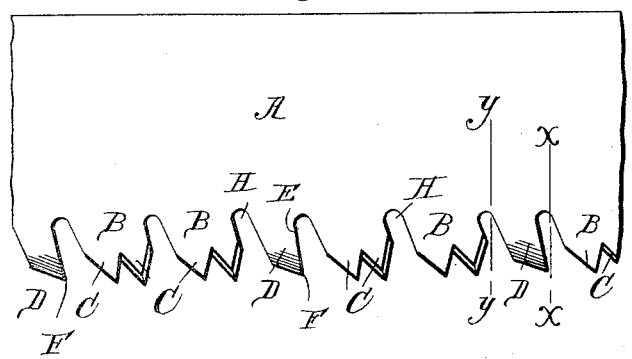
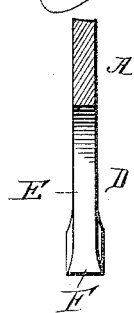
Fig. 2.
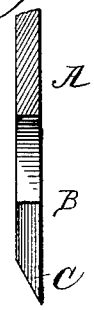
Fig. 3.
Fig. 4.
Witnesses,
Henry G. Dieterich
J. W. Garner
Inventor,
Alonzo Oakes,
By his Attorneys

UNITED STATES PATENT OFFICE.

ALONZO OAKES, OF TAYLOR, WISCONSIN, ASSIGNOR OF ONE-HALF TO ARTHUR R. ELLISON, OF SAME PLACE.

SAW.

SPECIFICATION forming part of Letters Patent No. 398,792, dated February 26, 1889.

Application filed May 26, 1888. Serial No. 275,141. (No model.)

*To all whom it may concern:*

Be it known that I, ALONZO OAKES, a citizen of the United States, residing at Taylor, in the county of Jackson and State of Wisconsin, have invented a new and useful Improvement in Saws, of which the following is a specification.

My invention relates to an improvement in buck-saws; and it consists in the peculiar construction and combination of devices that will be more fully set forth hereinafter, and particularly pointed out in the claim.

In the accompanying drawings, Figure 1 is a side elevation of a portion of a saw-blade provided with cutting and clearing teeth embodying my improvements. Fig. 2 is a transverse sectional view of the same, taken on the line $x$ $x$ of Fig. 1. Fig. 3 is a similar view taken on the line $y$ $y$ of Fig. 1. Fig. 4 is an edge view of my improved saw.

A represents a saw-blade, which is provided on its lower edge with the forwardly-inclined teeth B, the lower edges of which are bifurcated to form each a pair of V-shaped cutting-tongues, C. Arranged between each pair of teeth B is a clearing-tooth, D, which is likewise inclined forwardly, and has its lower edge inclined rearwardly and upwardly, as shown, the front side, E, of each clearing-tooth being perfectly square, and thereby forming a chisel edge or point, F, at its lower corner. The length of the clearing-teeth D is very slightly less than the length of the teeth B. The said teeth D and B are separated by incisions H of considerable depth.

The points C of each tooth B have their edges beveled on one side, so as to provide the said points with sharp cutting-edges, and the bevels on each pair of points C extend in opposite directions, one of said points of each pair being beveled on the right side, and the other point being beveled on the opposite side, thereby adapting the teeth B to cut both sides of the kerf. The said points C are also set or inclined laterally in opposite directions.

When the saw is in operation, the teeth B, being inclined forwardly, cause their points C to engage and cut in the bottom of the kerf, thereby keeping the saw continuously fed to its work, and preventing the same from moving back and forth in the kerf without deepening the latter. The depth of the recesses H is such as to permit the sawdust to accumulate between the teeth B while the saw is moving through the kerf, and the function of the teeth D is to clear away the sawdust from the kerf, and thereby prevent the same from binding against the saw.

The recesses H are further advantageous, inasmuch as they render it easy to sharpen the cutting-edges of the points C by means of a file, and, owing to the angle between the front and lower sides of the clearing-teeth D, the points E of said teeth may be readily kept sharpened by simply filing the lower edges of the said teeth.

Having thus described my invention, I claim—

The saw having the forwardly-inclined teeth B, bifurcated at the lower ends to form V-shaped cutting-points C, the latter being inclined laterally in opposite directions and beveled or sharpened on opposite sides, and the forwardly-inclined clearing-teeth D, arranged one between each pair of teeth B, said clearing-teeth being slightly shorter than the teeth B, and having their lower sides inclined upward and rearward, and provided at their lower front corners with the square chisel-edges F, substantially as described.

In testimony that I claim the foregoing as my own I have hereto affixed my signature in presence of two witnesses.

ALONZO OAKES.

Witnesses:
EDWARD A. ANDERSON,
HENRY OLSON.